United States Patent Office 3,606,899
Patented Sept. 21, 1971

3,606,899
PIPELINE TRANSPORTATION OF HIGH
VISCOSITY FLUIDS
J. O. Scott, Tulsa, Okla., assignor to
Cities Service Oil Company
No Drawing. Filed June 29, 1970, Ser. No. 50,879
Int. Cl. F17d 1/18
U.S. Cl. 137—13                                7 Claims

ABSTRACT OF THE DISCLOSURE

Described is a method for lowering the viscosity of a fluid being transferred in a pipeline by the introduction of a pelletized radioactive material, for example uranium oxide and its fission products, into the fluid that is being transported. The fluid and entrained radioactive material is then pumped at a controlled rate so that sufficient heat is released from the pellets to lower the viscosity of the pipelined fluid. At the exit of the pipeline the pellets are separated from the fluid and reused or discarded.

BACKGROUND OF THE INVENTION

The present invention relates to the transportation of fluids within a pipeline. More particularly, the invention relates to the use of radioactive materials in the pipelining of viscous crude oils.

Crude petroleum is produced from oil fields and may vary in composition from almost gas-like materials of high API gravity to semisolid asphaltic materials having an extremely low gravity and a resulting low viscosity. The pipeline transportation of these crude oils is extremely difficult when the API gravity becomes lower than about 25° to 20°. The pour point of the crude oil must also be taken into consideration in fluid pipelining. When the pour point temperature of the crude oil will be experienced during the pipelining operation, deposition of waxes will occur. Continued deposition upon the valves and the walls of the pipeline may inhibit the further transportation of crude oils through the pipeline network. Another pertinent consideration in the pipelining of viscous materials or crude oils with extremely high pour points is that over extremely long distances the application of heat or a solvent may be required to reduce the viscosity and lower the pour point of the crude oil to enable transportation.

One of the solutions to such problems is the design and construction of pipelines in a manner so as to minimize the heat loss from the fluid being pumped. By this procedure the viscosity of the crude oil being transported is maintained low enough such that the fluid will flow. Thus, in climates of extreme low temperature the pipeline will have to be heavily insulated and buried in deep trenches. Of course, the construction costs involved and the labor, maintenance and construction pace present a tremendous deterrent to the pipelining of crude oils in these regions.

Other solutions which appear to be satisfactory are to have intermediate pumping stations with external heating sources applied at intervals along the pipeline. This practice would require extreme pipeline insulation to minimize heat losses and a large expenditure of energy and equipment to maintain the heated oil flowing within the pipeline. Another method for lowering crude oil viscosity is by mixing of LPG or other suitable solvents with the crude oil. These solvents lower the crude oil viscosity effectively and render it mobile for pipeline transportation. In remote areas, the availability of LPG and the expediture of a relatively expensive solvent may not be desirable. Since the solvents are not always available in remote or sparsely populated areas and due to the expense and need for recovery of the solvent at the exit portion of the pipeline, this method usually is not economical. What is desired is a method by which the viscous crude oil may be rendered less viscous and thereby more mobile for transportation within a pipeline. Also required is an economic and easily applied process for the viscosity reduction of the viscous crude oil and for returning the crude oil to its original state upon exit from the pipeline without additive contamination.

It is an object of this invention to provide an improved method for the transportation of crude oils within pipelines.

It is another object of the present invention to provide a method by which crude oil may be transported within pipelines under adverse viscosity conditions.

It is still another object of the present invention to utilize the heat generated by radioactive materials to reduce the crude oil viscosity and prevent wax deposition during the transportation of crude oils within pipelines.

With these and other objects in mind the present invention is hereinafter set forth with particular reference to the following description.

SUMMARY OF THE INVENTION

The objects of the present invention are accomplished by a method for transporting highly viscous fluids, which normally exhibit a viscosity that inhibits their flow in a pipeline. The method comprises the introduction of a fissionable or radioactive material into the highly viscous fluid. The pipeline temperature is maintained by the heat generated by the atomic disintegration of the material such that the viscosity of the fluid contained within the pipeline is reduced to a satisfactory level. It is preferred that the radioactive material be a blend of radioactive materials and chemically inert solids or metallic oxides of the radioactive material which are fused in durable and abrasion resistant pellet form so that the pellets may be transmitted long distances through the pipelines without degradation. Upon delivery of the fluid from the pipeline, these pellets may be separated from the fluid, for example by screening, and shipped back to the pipeline source for further insertion into the pipeline. By particular choice of the radioactive material used, the pellets may be discarded at the exit portion of the pipeline such that a once-through operation is maintained. Radioactive material with a long life may be utilized repeatedly with only a slight decrease in the heat release of each cycled throughput.

DETAILED DESCRIPTION OF THE INVENTION

It has been known in the art of pipeline transportation that the adverse effects of high viscosity fluids being transported may be reduced or completely obliviated by the addition of heat to the fluid. The heat addition causes the viscosity and density of the fluid to decrease, resulting in a more easily transported solution. It has now been found that the addition of radioactive materials in pelletized or other form may yield results similar to these obtained by externally heating the fluid in the pipeline. The use of radioactive materials increases temperature due to disintegrations of the radioactive material and reduces the viscosity of the fluid to a tolerable level so that the pipelining operation is enhanced.

By choice of the radioactive material, the amount of heat generation may be controlled such that for a specific ratio of radioactive material to fluid transported, heat will be generated in a sufficient amount so as to reduce the viscosity of the fluid in the pipeline to an acceptable level, but without the disadvantage of dissipating excess heat which will be harmful to the pipeline itself. The method of the present invention does not contaminate or harm crude oil or other highly viscous fluids being transported and allows a safe and economic method by which the viscosity of the fluid transported may be reduced.

For the purposes of the invention disclosed herein, it is not necessary to discuss in detail the nature of the phenomenon known a atomic radiation. It is appropriate to point out, however, that in the process which is identified as nuclear fission, atoms are broken into a number of fragments, consisting mainly of atoms of lighter weight than the source atom. Inherent in the process of nuclear fission, as carried out in nuclear reactors, is the production of large numbers of radioisotopes of limited stability. The decay of these isotopes over a period of time is accompanied by the emission of radioactivity in various forms, and the absorption of such radiation by the surrounding material generates large amounts of heat. It is this thermal energy which is utilized by placing radioactive material within a pipeline which is conducting highly viscous fluids therethrough.

The operation of a nuclear reactor, of which there are many types, results in the activation of the materials which are used in the control of the process. The material that is activated may take the form of any of a large number of radioisotopes which may vary in nature over a wide range. The property which the present invention is particularly concerned with is the rate at which such isotopes emit radiation, also known as the specific activity, and the rate of decay, that is, the rate at which the unstable isotopes progress towards the condition of stability. The rate of decay is frequently expressed in terms of "half life" of the isotope, which is the time required for the number of the atom of the particular isotope in the unit sample of the material to be reduced by one-half.

The foregoing indicates that the materials which may be rendered radioactive for use in practicing the present invention are of almost infinite variety, and that the invention proposed contemplates the introduction of a material chosen from those readily available or which may be adapted for such use in accordance with the dictates of a number of factors, such as the specific activity, half life and economic availability of the isotopes and the characteristics of the particular material being transported within the pipeline. The last mentioned item, in the case of petroleum transportation, would involve the viscosity, specific gravity and other physical characteristics of the hydrocarbon being transported. Other significant factors include the outside temperature and other conditions to which the pipeline will be subjected and the rate at which the fluid will be transported through the pipeline.

Introduction of solid radioactive material into the pipeline offers several advantages and usually involves the use of such materials in pellet form. Suitable pellets may be formed of radioactive solids alone or may also include inert materials such as aluminum oxide, glass, steel, etc. Pellets may be of a wide range of sizes with sizes on the order of 0.125 to 2.0 inches being preferred. Demands of any particular pipeline installation will determine the size and shape of the pellets. The pellet type of material is attractive due to the fact that it will circulate with some freedom through the pipeline and be easily separable from the pipeline fluid at the exit of the pipeline. While solid radioactive material is preferred, it should be understood that gaseous or liquid material may be utilized with appropriate separation facilities.

In order to realize the objectives of the present invention in confining radioactive materials in a pipeline in which they cannot harm living organisms, continued control of the material is necessitated. Obviously, it would be extremely dangerous to introduce radioactive materials into a pipeline if the materials could find their way to the exterior portions of the pipeline or the radiation could be emitted from the pipeline to cause harmful effects to the surrounding ecology. It is therefore preferred in practicing the present invention that the radioactive material utilized not have an extremely long half life if it is to be a once-through pelletized usage. It is also preferred that radioactive material used emit only low-level alpha ray radiation accompanied by very sparse, if any, output of beta radiation and essentially no gamma radiation.

If these preferred criteria are met, the pellets may be easily handled by pipeline personnel by simple shielding techniques and should the pipeline fail or develop leaks, the fissionable material dissipated would not be harmful to personnel or the surrounding areas. If one-time use of radioactive material is desired, the amount of radioactive decay may be coordinated with the distance the fluid is to be shipped, with the radiation decreasing during conveyance to a level which will allow immediate use of the crude oil conveyed without separation of radioactive material therefrom.

As mentioned above, it is preferred that radioactive materials used in practicing the invention emit little, if any, beta or gamma radiation. Radiation may be measured in rads, an acronym for radiation absorbed dose, in which a rad is defined as that quantity of radiation that delivers 100 ergs of energy to 1 gram of tissue. Emission levels of less thna about 1.0 rad for beta and gamma radiation are preferred. Alpha radiation should be maintained at levels necessary to achieve the desired heat dissipation in view of the various factors mentioned with no radiation limits required as the alpha radiation will not penetrate the pipeline.

As an illustration of the effectiveness of the present invention, the following example is disclosed:

EXAMPLE

Listed in the table below are some of the practical radioisotope fuels available for high heat generation:

TABLE.—THE PRACTICAL RADIOISOTOPE FUELS

| Radioisotope fuel | Half-life (years) | Power density (watts/gram) | Major radiations |
| --- | --- | --- | --- |
| Strontium-90 | 28 | 0.93 | Beta, a few gammas. |
| Cesium-137 | 30 | 0.26 | Do. |
| Cerium-144 | 0.78 | 25 | Beta, many gammas. |
| Promethium-147 | 2.5 | 0.36 | Beta, a few gammas. |
| Polonium-210 | 0.38 | 141 | Alpha. |
| Plutonium-238 | 89 | 0.55 | Do. |
| Curium-242 | 0.45 | 121 | Do. |
| Curium-244 | 18 | 2.8 | Do. |

It is noted that the alpha radiators listed would be suitable for usage in the present nivention, Polonium-210 and Curium-242 being utilized for one-pass heating operations and Plutonium-238 and Curium-244 being utilized for cyclic heating operations.

As an example of the heating capability of these materials the pipelining of a crude oil having an initial temperature of 60° F., specific gravity of 0.8, specific heat of 1.0 B.t.u./lb. and losing 5° F. per hour through the pipeline would require 2.9 grams of Polonium-210 per barrel of oil to maintain the 60° F. initial temperature. The pipeline heating could be maintained continuously by the constant recycling of the fissionable material and addition of new pelletized fuel to replace the spent fuel.

It can be seen that the present invention discloses a method by which the viscosity effects of heavy crude oils may be overcome by the blending of a pellet or other form of radioactive material therewith. Where long half life, reusable solids are used, a simple screen solids separator may be placed at the downstream end of the pipeline so that the radioactive pellets are easily separated from the highly viscous fluid which was originally introduced into the pipeline. If a gaseous radioactive material is utilized a gas-liquid separator may be provided at the pipeline exit to separate the viscous fluid and radioactive material.

Standard radioactive disintegration equations may be utilized to predict the exact radioactive material to be applied in the pelletized form for heating a given quantity of transported fluid. By determining the physical properties of the transported fluid, one may choose from the vast list of radioactive materials available, and through simple engineering calculation determine the amount of radioactive material required for a given length of pipeline at a given flow rate to provide the reduction of viscosity required. It can be seen, therefore, by use of the method of the present invention, the adverse effects of fluid viscosity in pipeline transportation may be overcome by the addition of the radioactive material as is disclosed herein.

The present invention in its many embodiments provides a highly significant method for the transportation of highly viscous fluid within pipelines. The process is applicable to both viscous crude oils and other viscous materials which may set up or, in the conveyance of hydrocarbons, have a high pour point and deposit paraffins or waxy substances within the interior of the pipeline and the pipeline mechanisms, thereby disallowing further transportation therethrough. Recovery of the transported fluid at the downstream portion of the pipeline is enhanced by the physical separation of the radioactive material from the fluid being transported. The necessity to externally heat the material within the pipeline, insulate the pipeline, or add a solvent material which is not readily recovered and may contaminate the effluent from the pipeline is avoided. An economic and simplified method is provided by which the transported fluids may be conveyed even though they exhibit severe initial viscosity conditions. Also, a use is provided for waste radioactive materials which would otherwise have to be discarded by encasing them in cement or other shielding material and discarding them either into the oceans or burying them in the earth.

The invention has been described herein with respect to particular embodiments and aspects thereof. It will be appreciated by those skilled in the art that various changes and modifications may be made, however, without departing from the scope of the present invention.

Therefore, I claim:

1. A method for transporting fluids which normally exhibit a high viscosity which inhibits flow of the fluid through a pipeline, comprising:
   (a) introducing the viscous fluid into the pipeline;
   (b) introducing a radioactive material into the viscous fluid so that a temperature is maintained within the pipeline at which the viscosity of the fluid is held at a transportable level; and
   (c) producing the viscous fluid and radioactive material from the pipeline.

2. The method of claim 1 in which the radioactive material is in a pellet form.

3. The method of claim 2 in which the radioactive material is blended with an inert solid so as to form the pellet.

4. The method of claim 3 in which the fluid is crude oil.

5. The method of claim 3 further comprising a solids screen separator at the exit of the pipeline.

6. The method of claim 1 in which the radioactive material is a soluble gas.

7. The method of claim 6 further comprising a gas-liquid separator at the exit of the pipeline.

References Cited
UNITED STATES PATENTS

| | | | |
|---|---|---|---|
| 3,393,690 | 7/1968 | Chu | 137—13 |
| 3,474,806 | 10/1969 | Coldren | 137—13 |

ALAN COHAN, Primary Examiner